United States Patent Office 3,734,939
Patented May 22, 1973

3,734,939
N,N-DIALLYLGUANIDINE SALTS
Frederic Charles Schaefer, Darien, and Alan Carl Wright, Willimantic, Conn., assignors to American Cyanamid Company, Stamford, Conn.
No Drawing. Filed Jan. 18, 1971, Ser. No. 107,406
Int. Cl. C11c 3/00
U.S. Cl. 260—404.5                                 5 Claims

ABSTRACT OF THE DISCLOSURE 1,1-diallylguanidine and its salts are prepared by reaction of diallylamine with cyanamide or by reaction of diallylcyanamide with ammonium chloride, and are useful as biocides and for the formation of wet and dry strength agents for paper when copolymerized with acrylamide and reacted with glyoxal.

---

The present invention relates to 1,1-diallylguanidine and salts thereof, and to methods for the preparation of these compounds.

The discovery has now been made that 1,1-diallylguanidine, having the theoretical formula:

(1)
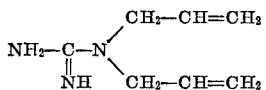

and salts thereof are useful as antimicrobial agents, as emulsifying agents, as detergents, as sizing agents for paper; and as raw materials for the manufacture of water-soluble cationic thermosetting strength resins for paper.

At room temperature 1,1-diallylguanidine free base is soluble in water, methanol, ethanol, butanol, acetonitrile and acetone. The acetate, chloroacetate, nitrate, hydrobromide, hydrochloride, maleamate and benzenesulfonate salts of 1,1-diallylguanidine are very water-soluble. We have found that dilute solutions of the free base in any of the solvents named, and dilute solutions of the aforementioned salts of 1,1-diallylguanidine in water, when sprayed on sawdust, woodchips, paper, leather, and painted surfaces, inhibit the growth of algae, fungi and bacteria thereon.

1,1-diallylguanidine in free base and in dissolved salt form is cationic and is substantively adsorbed by cellulose fibers in dilute aqueous suspension.

1,1-diallylguanidine is most conveniently prepared as a water-soluble salt after which the compound itself can be recovered in free base form.

When used as a surface biocide 1,1-diallylguanidine or a suitable salt is dissolved in a suitable volatile solvent and the solution is sprayed, printed or otherwise applied to the surface to be protected. Evidently because of its strong cationic nature the compound is well retained by most surfaces and imparts long-lasting protection thereto. Suitable solvents are shown above. A suitable concentration of the 1,1-diallylguanidine in the solvent can be found by trial. As an illustration, concentrations in the range of 0.1%–0.5% are suitable for dry, non-absorbent surfaces, and concentrations of 0.5%–1% are suitable for moist and absorbent surfaces. The solvent evaporates and the residue inhibits microbial growth.

1,1-diallylguanidine and its salts are particularly useful as raw materials for the manufacture of wet strength resins. The resins are prepared by copolymerizing 1,1-diallylguanidine with acrylamide in molar ratios between 1:4 and 1:20 to form a water-soluble linear non-thermosetting carbon chain polymer composed of cyclo-1,1-diallylguanidine and acrylamide linkages, after which the polymer is reacted with sufficient glyoxal to render it thermosetting. The formula of the cyclo-1,1-diallylguanidine linkage has not been ascertained, but the evidence indicates that its theoretical configuration is:

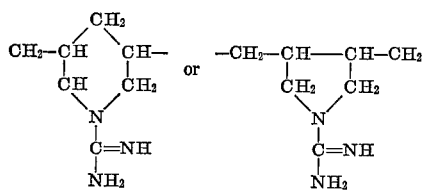

The acrylamide is present as linkages of the theoretical configuration:

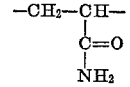

This polymer, when reacted with sufficient glyoxal to be thermosetting, is strongly cationic and substantive to cellulose fibers in aqueous suspension at a pH in the range of 5–8, and provides paper having a substantial amount of temporary wet strength. This polymer, methods for the manufacture thereof and paper containing the same, and processes for the manufacture of the paper are claimed in copending application Ser. No. 107,456, filed herewith by Hans Peter Panzer and Louis Vincent McAdams. The polymer is unusally efficient and imparts more temporary wet strength per unit weight than polymers heretofore known when the paper is dried under conditions commonly employed in industrial practice.

1,1-diallylguanidine and its salts can be prepared in simple and efficient manner (a) by reaction of diallylamine with cyanamide and (b) by reaction of diallylcyanamide with ammonium chloride, as is more particularly hereinafter explained.

According to one method, water-soluble 1,1-diallylguanidine salts are prepared by forming an anhydrous equimolar reaction mixture of a water-soluble salt of diallylamine and cyanamide ($H_2NCN$) in an inert solvent for these reagents which boils in the range of 70°–150° C., and heating the mixture at a reaction temperature.

The reaction proceeds according to the theoretical equation:

(2)
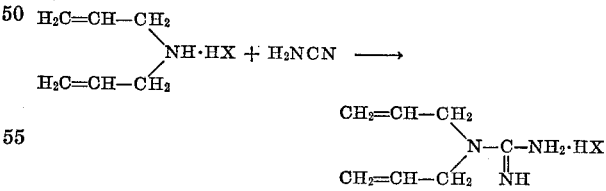

wherein X is the anion of an acid. The product crystallizes from the reaction mixture and can be filtered off. Suitable diallylamine salts for use in this method include the acetate, benzenesulfonate, chloroacetate, hydrobromide and hydrochloride. Acetonitrile is suitable as the inert solvent. The reaction of the diallylamine with the cyanamide is exothermic, and sufficient acetonitrile is used to permit the exotherm to be controlled. The reaction is considered to have arrived at its practical end point when the rate of formation of 1,1-diallylguanidine becomes uneconomically slow.

According to another method, an aqueous reaction mixture is prepared from equimolar proportions of diallylcyanamide and an ammonium salt of a water-soluble acid, and the mixture is heated under pressure in an autoclave in the presence of aqueous ammonia:

(3)
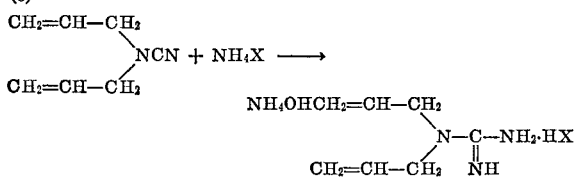

wherein X designates the anion of a water-soluble acid. In this reaction ammonium chloride and bromide are preferred because, of the salts so far tried, they give the best yields of 1,1-diallylguanidine. Temperatures in the range of 125°–250° C. are suitable. At the end of the reaction any unreacted diallylcyanamide can be recovered by adding water as needed to give a solution of the product, and extracting the solution with ether. The water can subsequently be removed by azeotropic distillation with toluene, and the residue (the 1,1-diallylguanidine salt) can be purified by crystallization from acetonitrile.

The invention is more particularly illustrated by the examples which follow. These examples are specific embodiments of the invention and are not to be construed as limitations thereon.

EXAMPLE 1

The following illustrates the preparation of 1,1-diallylguanidine hydrochloride.

In a 1.7-liter stainless steel autoclave are charged 244 g. (2.0 mols) of diallylcyanamide of 95.8% purity, 230.4 g. (4.0 mols) of ammonium chloride, 136 ml. (2.0 mols) of concentrated ammonium hydroxide, and 136 g. of water. The autoclave is heated to 160° C. over a 1.5 hr. period and held at this temperature for an additional 2 hours with a resulting pressure of 100 lb./in.$^2$. The contents of the autoclave are filtered to remove part of the unreacted ammonium chloride. The water in the solution is removed by azeotropic distillation, n-butanol being added as azeotrope medium before and during the course of the distillation. The hot solution is filtered to remove the remaining unreacted ammonium chloride. The solution is cooled and the butanol is distilled off. 1,1-diallylguanidine hydrochloride separates as white needles which are filtered, washed with acetonitrile, and dried. The yield is about 60% of theory. On recrystallization from 500 ml. of acetonitrile and 70 ml. of n-butanol the product melts at 128°–133° C.

EXAMPLE 2

The following illustrates the preparation of 1,1-diallylguanidine free base by reaction of a hydrohalide salt of 1,1-diallylguanidine with sodium methoxide in methanol.

To 500 cc. of anhydrous methanol is added 54 g. (1 mol) of sodium methoxide followed by 188 g. (1 mol) of the above-prepared 1,1-diallylguanidine hydrochloride, and the mixture is stirred for one hour at 20° C. The solution is filtered to remove the sodium chloride, and the methanol is evaporated from the filtrate under vacuum. The residue is 1,1-diallylguanidine.

EXAMPLE 3

The following illustrates the preparation of 1,1-diallylguanidine acetate.

To 102 g. (1.05 mol) of diallylamine in an ice bath are added successively 60 g. (1.0 mol) of glacial acetic acid, 42 g. (1.0 mol) of anhydrous cyanamide and 50 ml. of acetonitrile as solvent. The resulting solution is transferred to a dropping funnel and added at uniform rate over 90 minutes to 25 ml. of refluxing acetonitrile. After about a third of the solution has been added, product crystals appear and the mixture becomes progressively thicker. The temperature rises from 82° C. to 96° C. during the addition. The final mixture is refluxed for 90 minutes, and cooled and filtered. The recovered white crystals are rinsed with acetonitrile and dried under vacuum, M.P. 214° C.–216.5° C. The salt is soluble in water.

EXAMPLE 4

The following illustrates the preparation of 1,1-diallylguanidine stearate.

To a solution of 1,1-diallylguanidine in ether is added dropwise a solution of stearic acid in either. Crystals of 1,1-diallylguanidine stearate precipitate. The crystals are recovered by filtration, washed in acetontrile, and dried, M.P. 150°–151° C. The compound possesses soap-like properties in water, and is a detergent. It imparts water resistance to paper having a content thereof.

EXAMPLE 5

The following illustrates the preparation of 1,1-diallylguanidine hydrobromide by reaction of diallycyanamide with ammonia or ammonium hydroxide.

Into a glass bomb tube are placed 1.22 g. (0.010 mol) of diallylcyanamide, 0.98 g. (0.010 mol) of ammonium bromide, and 0.01 mol of NH$_4$OH as a 15 N solution (to provide free ammonia). The tube is placed in an oven for 2.5 hours and then cooled. The contents are dissolved in water and the 1,1-diallylguanidine is precipitated as the picrate (yield 52 of theoretical).

EXAMPLE 6

The following illustrates the preparation of 1,1-diallylguanidine picrate.

To a sample of solution of 1,1-diallylguanidine in diethyl ether is added a small amount of picric acid in ether. 1,1-diallylguanidine picrate precipitates, M.P. 190° C.–192° C.

EXAMPLE 7

The following illustrates the preparation of 1,1-diallylguanidine carbonate.

The procedure of Example 1 is repeated, except that the ammonium chloride is replaced by an equivalent amount of ammonium carbonate monohydrate.

EXAMPLE 8

The following illustrates the preparation of 1,1-diallylguanidine sulfate.

To 100 cc. of 0.1 N H$_2$SO$_4$ in an ice bath is added 0.2 mol of 1,1-diallylguanidine in methanol solution and the mixture is stirred. White crystals of 1,1-diallylguanidine sulfate are recovered by evaporation of the water.

EXAMPLE 9

The solubility of 1,1-diallylguanidine hydrochloride in various liquids is as follows.

| Liquid | Solubility, g./100 g. 20° C. | Reflux |
|---|---|---|
| Water | Ca. 140 | 500 |
| Methanol | Ca. 100 | |
| Ethanol | 26 | |
| n-Butanol | Ca. 6.3 | 33 |
| Acetonitrile | Ca. 0.34 | 11 |
| Ethyl acetate | Very slightly soluble | |
| Acetone | do | |

1,1-diallylguanidine acetate has similar solubility.

EXAMPLE 10

The following illustrates the manufacture of paper rendered resistant to microbial growth by a uniformly adsorbed content of 1,1-diallylguanidine.

An aqueous suspension of well-beaten cellulose papermaking fibers at a consistency of 0.6% is adjusted to pH 8, and to this is added 1% based on the dry weight of the fibers of 1,1-diallylguanidine (as the acetate) as a 1% solution in water. The suspension is briefly stirred, and the fibers are made into handsheets and dried according to standard laboratory procedure. The handsheets resist the growth of algae, molds, and bacteria thereon.

We claim:
1. 1,1-diallylguanidine.
2. A salt of the guanidine of claim 1 selected from the group consisting of the acetate, chloroacetate, nitrate, hy- drobromide, hydrochloride, maleamate, benzenesulfonate, stearate, picrate, sulfate and carbonate.

3. The acetate salt of the guanidine of claim 1.
4. The hydrochloride salt of the guanidine of claim 1.
5. The stearate salt of the guanidine of claim 1.

References Cited

UNITED STATES PATENTS

| 2,666,745 | 1/1954 | Mullen et al. | 260—564 A |
| 2,671,076 | 3/1954 | Price | 260—564 A |

OTHER REFERENCES

Chemical Abstracts, vol. 67, col. 22960(Y) (1967).

BERNARD HELFIN, Primary Examiner

G. A. SCHWARTZ, Assistant Examiner

U.S. Cl. X.R.

21—7, 58; 162—168, 161; 260—501.14, 564, 501.11, 80.3; 424—326, 316

UNITED STATES PATENT OFFICE
CERTIFICATE OF CORRECTION

Patent No. 3,734,939    Dated May 22, 1973

Inventor(s) FREDERIC CHARLES SCHAEFER and ALAN CARL WRIGHT

It is certified that error appears in the above-identified patent and that said Letters Patent are hereby corrected as shown below:

Column 4 line 5, "either" should read -- ether --.

Signed and sealed this 12th day of March 1974.

(SEAL)
Attest:

EDWARD M. FLETCHER, JR.
Attesting Officer

C. MARSHALL DANN
Commissioner of Patents